(12) United States Patent
Nino et al.

(10) Patent No.: US 11,085,471 B2
(45) Date of Patent: Aug. 10, 2021

(54) ACTIVE CONTROL OF VORTICES FOR SKIN FRICTION REDUCTION

(71) Applicants: Quest Integrated, LLC, Kent, WA (US); University of Washington, Seattle, WA (US)

(72) Inventors: Giovanni Nino, Issaquah, WA (US); Robert E. Breidenthal, Seattle, WA (US); Aline Cotel, Ann Arbor, MI (US)

(73) Assignees: Quest Integrated, LLC, Kent, WA (US); University of Washington, Seattle, WA (US)

( * ) Notice: Subject to any disclaimer, the term of this patent is extended or adjusted under 35 U.S.C. 154(b) by 969 days.

(21) Appl. No.: 15/630,380

(22) Filed: Jun. 22, 2017

(65) Prior Publication Data

US 2017/0370387 A1    Dec. 28, 2017

Related U.S. Application Data

(60) Provisional application No. 62/353,401, filed on Jun. 22, 2016.

(51) Int. Cl.
| | |
|---|---|
| *F15D 1/12* | (2006.01) |
| *B64C 23/00* | (2006.01) |
| *B64C 23/06* | (2006.01) |
| *B64C 21/00* | (2006.01) |
| *F15D 1/00* | (2006.01) |

(52) U.S. Cl.
CPC ............. *F15D 1/12* (2013.01); *B64C 21/00* (2013.01); *B64C 23/005* (2013.01); *B64C 23/06* (2013.01); *F15D 1/008* (2013.01); *F15D 1/0075* (2013.01); *Y02T 50/10* (2013.01)

(58) Field of Classification Search
CPC ... B64C 23/005; B64C 23/06; B64C 2230/12; F15D 1/0075
See application file for complete search history.

(56) References Cited

U.S. PATENT DOCUMENTS

| | | | |
|---|---|---|---|
| 6,837,465 B2 | 1/2005 | Lisy et al. | |
| 7,735,782 B2* | 6/2010 | Kloker | B64C 21/06 244/130 |
| 8,417,395 B1 | 4/2013 | Prince et al. | |
| 10,086,926 B2* | 10/2018 | Tanaka | B64C 23/06 |
| 10,155,373 B2* | 12/2018 | Nino | B64C 3/26 |
| 2008/0061192 A1 | 3/2008 | Sullivan | |
| 2009/0114002 A1 | 5/2009 | Bernitsas et al. | |

(Continued)

OTHER PUBLICATIONS

Balle, G.J., and R.E. Breidenthal, "Stationary Vortices and Persistent Turbulence in Karman Grooves," Journal of Turbulence 3(1):033, Aug. 2002, 18 pages.

(Continued)

*Primary Examiner* — Richard R. Green
(74) *Attorney, Agent, or Firm* — Christensen O'connor Johnson Kindness PLLC

(57) ABSTRACT

Systems and method for active control of stationary vortices for aerodynamic structures are disclosed herein. In one embodiment, a method for active control of vortices over a solid surface includes: generating vortices proximate to the solid surface; sensing locations of vortices by printed skin sensors; and maintaining the vortices in their fixed spanwise positions with respect to the solid surface by actuation of printed skin actuators.

29 Claims, 18 Drawing Sheets

(56) References Cited

U.S. PATENT DOCUMENTS

| | | | |
|---|---|---|---|
| 2011/0142595 | A1 | 6/2011 | Santiago et al. |
| 2011/0203937 | A1* | 8/2011 | Sidhu .................. C25D 5/02 205/133 |
| 2012/0091266 | A1 | 4/2012 | Whalen et al. |
| 2012/0193483 | A1 | 8/2012 | Essenhigh et al. |
| 2012/0248072 | A1 | 10/2012 | McClure et al. |
| 2013/0037657 | A1 | 2/2013 | Breidenthal |
| 2013/0291979 | A1 | 11/2013 | Nordin et al. |

OTHER PUBLICATIONS

Dawson, O.R., et al., "Relaminarization Using Stationary Vortices," 2014, <https://www.aa.washington.edu/sites/aa/files/research/fluidDynamic/publications/Dawson_et_al.pdf> [retrieved at least as early as Jun. 22, 2016], 8 pages.

Oster, D., and I. Wygnanski, "The Forced Mixing Layer Between Parallel Streams," Journal of Fluid Mechanics 123:91-130, Oct. 1982.

Roshko, A., "Structure of Turbulent Shear Flows: A New Look," AIAA Journal 14(10):1349-1357, 1976.

Saffman, P.G., "Vortex Dynamics," Cambridge Monographs on Mechanics and Applied Mathematics, 1992, reprint 1993, Cambridge University Press, Cambridge, U.K., 311 pages.

Cotel, A.J., and R.E. Breidenthal, "Jet Detrainment at a Stratified Interface," Journal of Geophysical Research: Atmospheres 102(D20):23813-23818, Oct. 1997.

Cotel, A.J., et al., "Laboratory Experiments of a Jet Impinging on a Stratified Interface," Experiments in Fluids 23(2):155-160, Jun. 1997.

Bai, H.L. et al., "Active Control of a Turbulent Boundary Layer based on Local Surface Perturbation", Journal of Fluid Mechanics, Jul. 10, 2014, vol. 750, pp. 316-354.

Nakanishi et al., "Relaminarization of Turbulent Channel Flow Using Traveling Wave-Like Wall Deformation", International Journal of Heat and Fluid Flow, Jun. 30, 2012, vol. 35, pp. 152-159.

Luo, X., "Plasma Based Jet Actuators for Flow Control", Dissertation, University of Southampton, May 2012, 140 pages.

* cited by examiner

CROSS-SECTION A-A

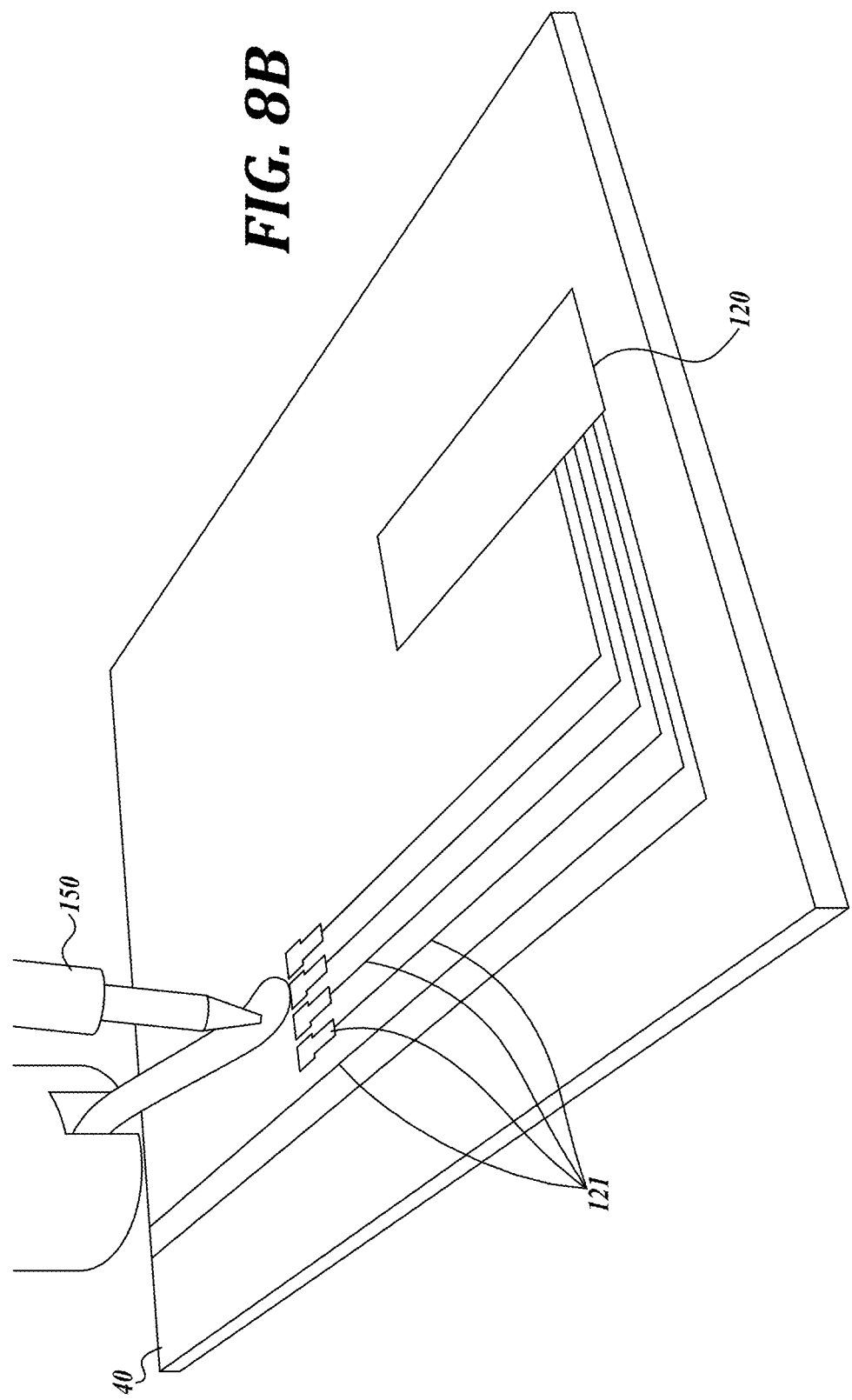

ACTIVE CONTROL OF VORTICES FOR SKIN FRICTION REDUCTION

CROSS-REFERENCE TO RELATED APPLICATION

This application claims the benefit of Provisional Application No. 62/353,401, filed Jun. 22, 2016, which is incorporated herein by reference.

STATEMENT OF GOVERNMENT LICENSE RIGHTS

This invention was made with Government support under FA9550-15-C-0007 awarded by Air Force Office of Scientific Research. The Government has certain rights in the invention.

BACKGROUND

Fuel is the largest direct operating cost for airlines. Furthermore, the emissions of $CO_2$ are a growing environmental concern, and the water vapor emissions at high altitude may also play a role in the Earth's radiation budget and climate. If the aerodynamic drag of an aircraft is reduced, the engine thrust and, consequently, emissions can also be reduced. A significant component of the total drag is skin friction. For example, on a large, transonic aircraft the boundary layers are almost completely turbulent, having relatively large skin friction coefficients.

In many other devices, a relatively high heat transfer coefficient in turbulent boundary layers limits the performance of the device. For example, heat transfer to the turbine blades can limit efficiency of modern aircraft turbine engines, because the turbine blades overheat in operation. With some conventional technologies, excess diluent air must be added into the hot combustor gases to prevent melting of the blades. As a result, the peak cycle temperature of these turbines is reduced, thus lowering their thermodynamic efficiency and fuel economy. As another example, rocket nozzles must be cooled to prevent melting. The cooling mechanism adds weight, complexity, and failure modes to these rocket engines. Consequently, in many applications it is desirable to delay the turbulent flow by maintaining the laminar flow at the wall as long as possible.

In many cases, transition from a laminar flow to a turbulent flow is accompanied with vortex formation close to a solid wall. FIG. 1 is a schematic view of a vortex. Fluid (e.g., air or water) flows at free stream velocity $U_\infty$ toward a solid surface 10. As the fluid starts to flow over the solid surface 10, a boundary layer is formed, eventually generating vortices 15. The illustrated vortex 15 may be characterized by its translational (streamwise) velocity V and its rotational velocity W. One measure of the vortex stationarity is the vortex persistence, which is the ratio of the rotational and the translational velocity of the vortex 15 (W/V). In general, greater ratio W/V signifies a vortex that is more stationary with respect to the surface. As the vortices 15 are swept downstream (in the direction of axis X of the coordinate system 20), the vortices will eventually promote a rollup of the upper portion of the boundary layer, and separation of the boundary layer from the solid boundary 10, ultimately leading to a turbulent boundary layer. Generally, the turbulent boundary layer is thicker than the laminar one, therefore increasing the drag force of an object in the flow, e.g., an airplane or a ship.

It has been understood that vortices 15 also have tendency to move in the spanwise direction (direction of axis Y), which further promotes transition of a laminar flow into a turbulent flow. Some conventional technologies attempt to reduce this spanwise movement of the vortices by mechanical barriers, as described with reference to FIG. 2 below.

FIG. 2 is a schematic isometric view of a wavy wall 30 in accordance with prior art. The vortices 15 are generally distributed in a spiral (helical) shape of the vortex street 35. With the illustrated conventional technology, the waviness of the wall 30 limits the spanwise (Y-direction) travel of the vortices.

An array of vortex generator plates 25 are aligned upstream of the troughs of the wavy wall to assure that the vortex streets 35 form in the troughs of the wavy wall 30. With some conventional technologies, the vortex generators are inclined plates that generate vortices at their corner that is exposed to the free stream. Since the wavy wall 30 reduces the spanwise motion of the vortex street 35, the onset of the turbulent boundary layer is also delayed. Some conventional technologies attempt to integrate the wavy wall with the airplane wing, as described with reference to FIG. 3 below.

FIG. 3 is an isometric view of a wavy wall integrated with an airplane wing 40 in accordance with prior art. The vortex generator plates 25 are aligned against the troughs of the wavy wall 30. As a result, the spanwise motion of the vortex street 35 is limited, thus delaying the onset of the turbulent flow. However, fixed shapes (e.g., wavy wall) typically only work well for a narrow range of yaw angles, and they may not produce stable, stationary vortices over long streamwise distances.

With some conventional technologies, microscopic riblets are placed on the surface to slow the transition from laminar to turbulent flow. However, the riblets operate at the Kolmogorov microscale, which may be just a few thousandths of an inch for a large surface. As a consequence, the riblets can be quickly contaminated by even very small dirt particles, therefore diminishing their usefulness. Furthermore, the drag reduction benefits are present only when the riblets are closely aligned with the local flow direction, therefore limiting the benefits of the riblets for even small yaw angles.

Accordingly, there remains a need for systems that can delay the onset of turbulence of the boundary layer over the solid boundary, while exhibiting less sensitivity to yaw angles.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one embodiment, a method for active control of vortices over a solid surface includes: generating vortices proximate to the solid surface; sensing locations of vortices by printed skin sensors; and maintaining the vortices in their fixed spanwise positions with respect to the solid surface by actuation of printed skin actuators.

In one aspect the method also includes maintaining the vortices at their fixed heights with respect to the solid surface by actuation of the printed skin actuators.

In another aspect, the method also includes sensing strength of vortices by printed skin sensors.

In another aspect, the method also includes receiving an input from the printed skin sensors by a controller, and providing an output from the controller for the actuation of the printed skin actuators.

In one aspect, the controller includes an algorithm for determining the output of the controller.

In one aspect, the vortices are generated by at least one vortex generator plate.

In one aspect, at least one vortex generator includes a vortex generator plate that carries a first vortex generator electrode and a second vortex generator electrode. The method also includes: generating a flow of ions from the first vortex generator electrode to the second vortex generator electrode; and in response to generating the flow of ions, modulating strength and/or location of the vortices.

In one aspect, the surface includes a wavy wall, and the sensors and actuators are disposed downstream of the wavy wall.

In one aspect, the vortices are located along troughs of the wavy wall.

In one aspect, the sensors are pressure sensors.

In one aspect, the sensors are printed by 3D additive manufacturing over the surface.

In one aspect, the actuators are printed by 3D additive manufacturing over the surface. The actuators are selected from a group consisting of: an ionic wind generator, a plasma actuator, a chemical actuator, an optical actuator, an electromagnetic actuator, and a pneumatic actuator.

In one aspect, the actuators generate a local flow directly vertically under corresponding vortices.

In one aspect, the actuators generate a local flow that is vertically offset with respect to a location of the corresponding vortices.

In one embodiment, a system for active control of vortices over a solid surface, includes: printed skin sensors for sensing locations and/or strength of the vortices; a controller for receiving an input from the printed skin sensors; and printed skin actuators configured to maintain the vortices in their fixed spanwise locations with respect to the solid surface.

In one aspect, the printed skin actuators maintain the vortices at their fixed heights with respect to the solid surface.

In one aspect, the printed skin sensors are pressure sensors, stress tensors, or velocity sensors.

In one aspect, the pressure sensors are embedded in the surface.

In one aspect, the printed skin sensors and the printed skin actuators are deposited on the surface by an additive 3D printing.

In one aspect, the printed skin sensors and the printed skin actuators are less than 10 microns thick.

In one aspect, the printed actuators can be: an ionic wind generator, a plasma actuator, a chemical actuator, an optical actuator, an electromagnetic actuator, and a pneumatic actuator.

In one aspect, the controller changes a polarity of a voltage applied to the ionic wind generator and/or the plasma actuator.

In one aspect, the system includes a vortex generator having: a vortex generator plate that carries a first vortex generator electrode and a second vortex generator electrode. The vortex plate generate vortices, and the first and the second vortex generator generate a flow of ions that modulates strength and/or position of the vortices.

In one aspect, the surface is a part of: a three dimensional printed model of an aircraft, a machined model of an aircraft or a portion of an aircraft, a cast model of an aircraft or a portion of an aircraft, an Unmanned Aerial Vehicle (UAV), helicopter, a propeller airplane, a jet airplane, a wind turbine blade, a turbine blade, a rocket, or a car.

In one aspect, the controller computes an intensity and a position of the at least one vortex based on an input signal received from the pressure sensors.

In one aspect, the actuators generate a local flow directly under corresponding vortices.

In one aspect, the surface is an underwater surface. The actuators inject gaseous bubbles near vortices, and the bubbles migrate into cores of the vortices, resulting in hollow core vortices.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 8A-8C are schematic views of sensors in accordance with embodiments of the presently disclosed technology.

DETAILED DESCRIPTION

Specific details of several embodiments of representative systems for active control of vortices and associated methods are described below. Briefly described, a vortex street (an array of vortices) can be generated close to a leading edge of an aerodynamic structure (e.g., airplane wing, submarine hull, etc.) by a vortex generator. The vortices are swept downstream and distributed in a helical vortex street in the streamwise direction of the aerodynamic structure. In absence of any restraint in the spanwise direction (e.g., a wavy wall), the vortex street becomes unstable in the spanwise direction, therefore promoting a transition to turbulent flow.

With some embodiments of the inventive technology, the vortices can be maintained in a relatively fixed spanwise position and/or height with respect to the aerodynamic surface by actuators, therefore preventing or at least delaying the onset of the turbulence. For example, 3D printed actuators can generate localized fluid velocity (e.g., vertical jets, inclined jets, local velocity along the surface, etc.) at the aerodynamic surface to keep the vortices at a fixed position with respect to the aerodynamic surface.

In some embodiments, the location and/or strength of the vortices is detected by sensors (e.g., pressure sensors) at the aerodynamic surface. The output of the sensors can be routed to a controller (e.g., a computer) to produce control signals for the actuators. In some embodiments, the sensors and/or actuators can be printed on the aerodynamic surface using additive process of 3D printing. The aerodynamic surface may be part of an aerodynamic body such as wings, propellers, fuselages, aircrafts, unmanned flying vehicles, rockets, cars, trains, turbine engines and wind turbine blades, which may operate in subsonic, transonic or supersonic regimes.

Figure 1:
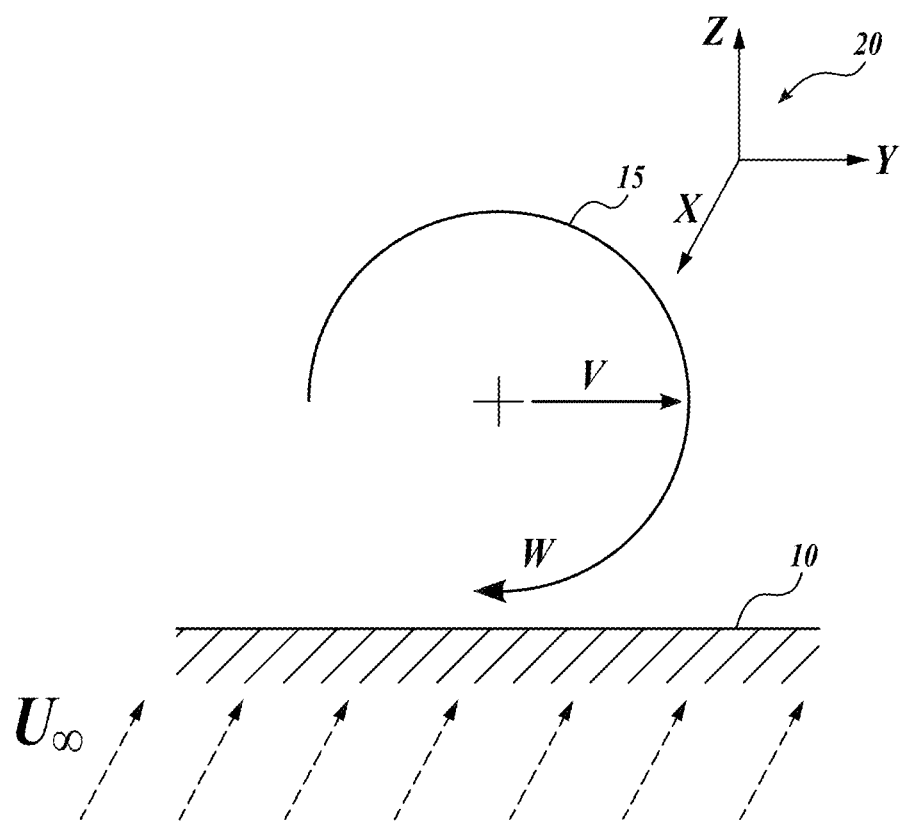
FIG. 1 is a schematic view of a vortex.
Figure 2:
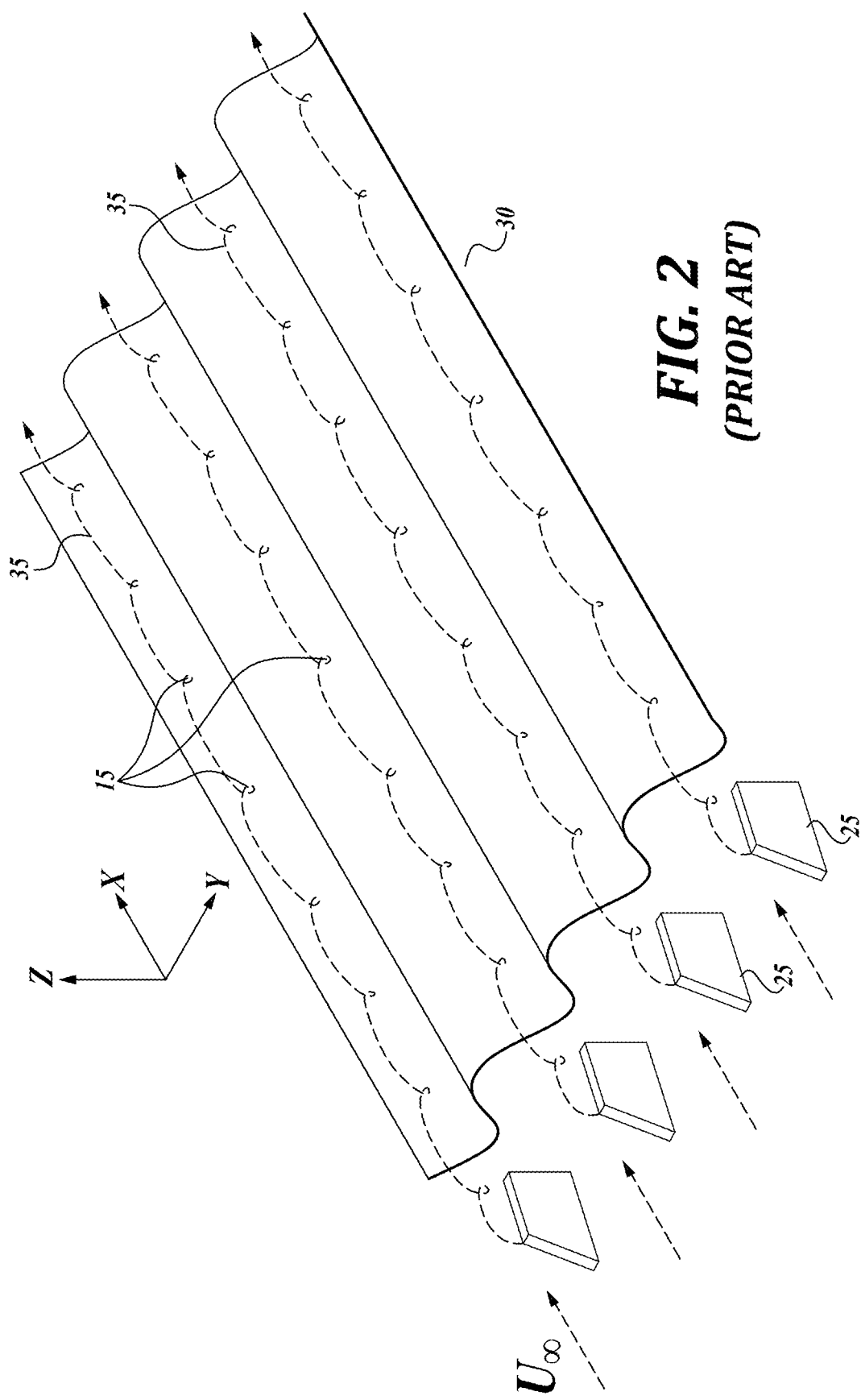
FIG. 2 is a schematic isometric view of a wavy wall in accordance with prior art.
Figure 3:
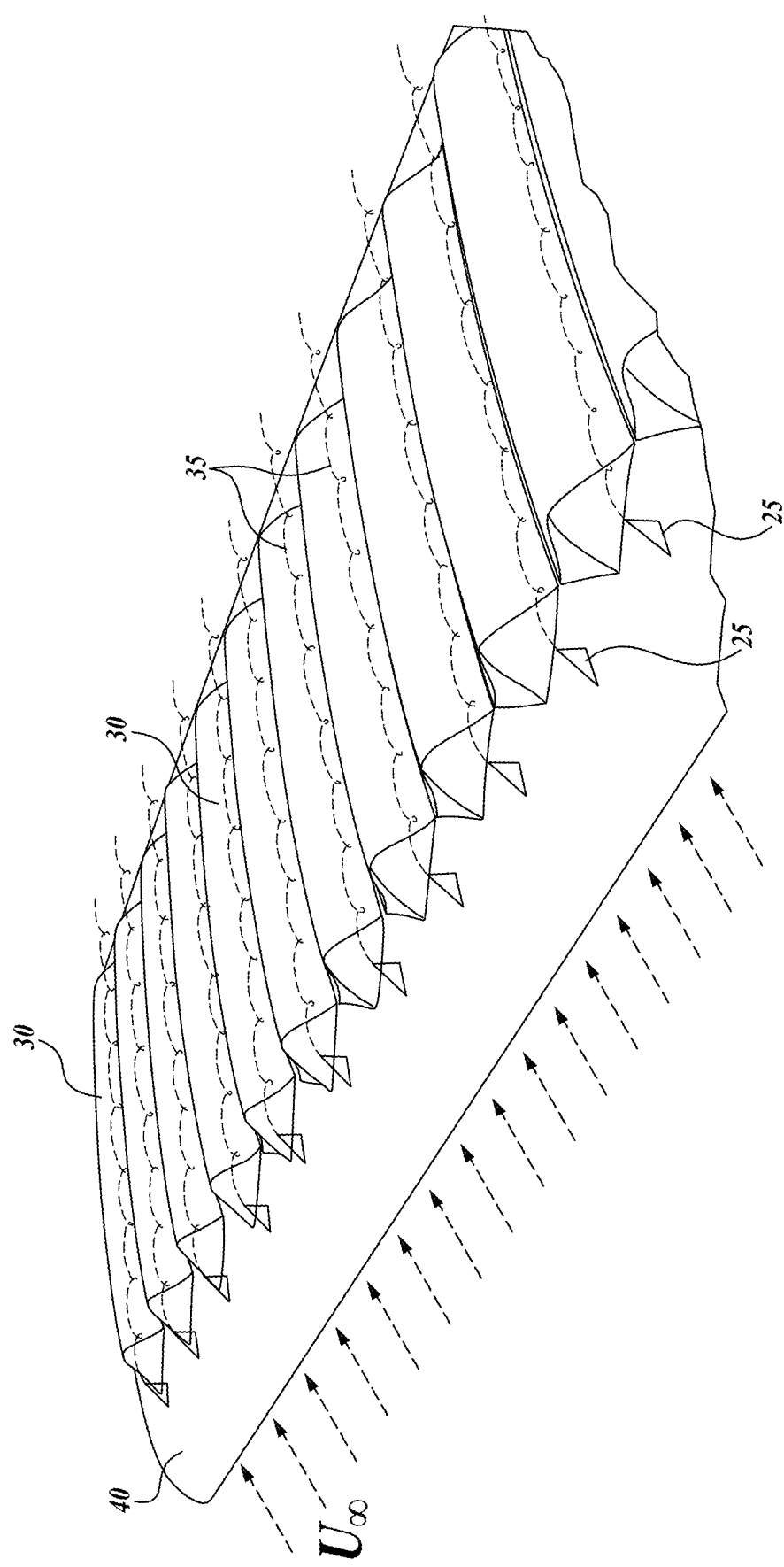
FIG. 3 is an isometric view of a wavy wall integrated with an airplane wing in accordance with prior art.
Figure 4:
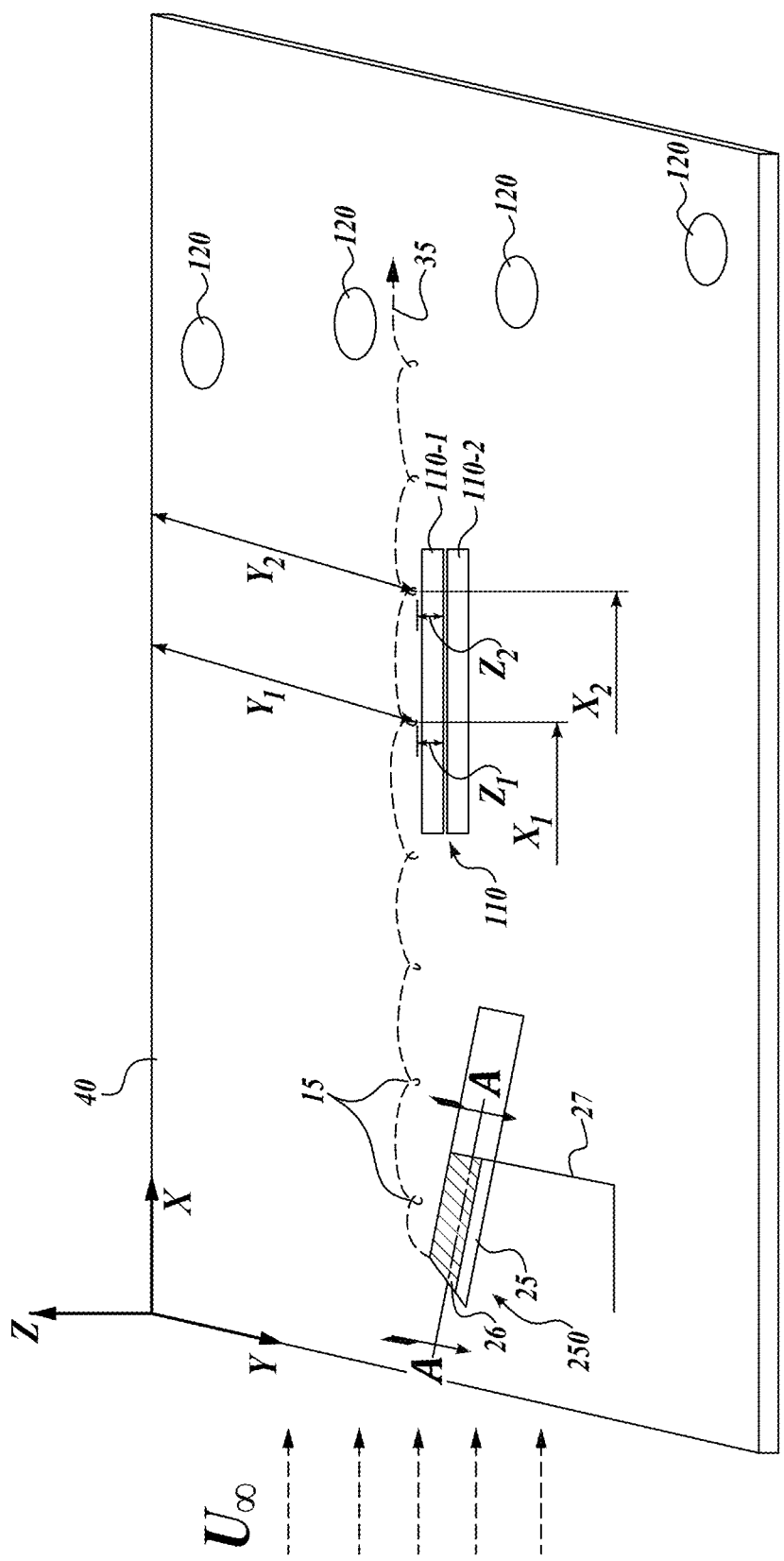
FIG. 4 is a schematic view of active flow control in accordance with embodiments of the presently disclosed technology.

FIG. 4 is a schematic view of active flow control in accordance with embodiments of the presently disclosed technology. With the illustrated embodiment, fluid approaches an aerodynamic structure 40 (e.g., aircraft wing, turbine blade, etc.) at free stream velocity $U_\infty$. An upstream vortex generator 250 can produce vortices 15 in the vortex street 35. As explained above, an array of equally spaced and equal strength vortices at equal height over a flat plate may be in equilibrium, but not stable. A small perturbation to one vortex will cause the vortex and its neighbors to depart from their equilibrium positions. However, the force required to restore the vortex back to its initial position may in many embodiments be small as long as the vortex did not move too far from its initial position.

In some embodiments, an actuator 110 can actuate a location of the vortex to keep the vortex stationary or generally stationary for at least a period of time in a given spanwise location Y, height Z above the aerodynamic structure 40, and a streamwise location X. Some examples of the actuators are ionic wind generators, plasma jets, and fluid jets. In general, the vortices that are displaced from their nominal position X, Y, Z may be nudged back into their nominal position by the actuators.

In some embodiments, the actuation of the actuator 110 is based on measurements provided by sensors 120, for example, the pressure sensors. In some embodiments, the actuators 110 and/or sensors 120 can be printed on the aerodynamic surface using 3D printing by partially additive processes or entirely additive processes.

Figure 4A:
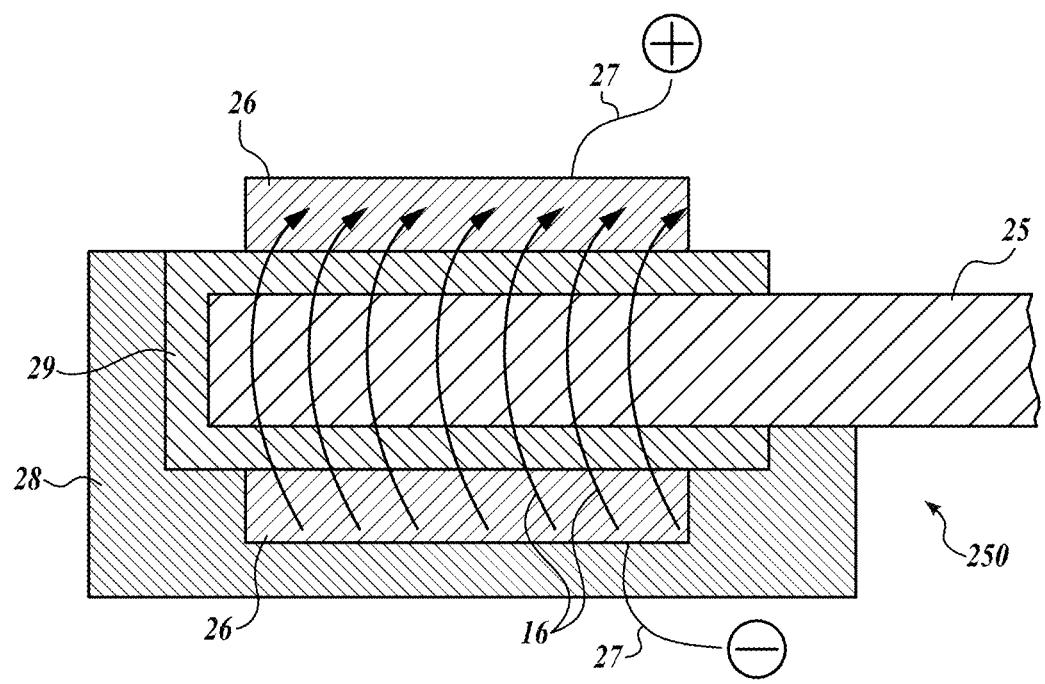
FIG. 4A is a cross-sectional view of a vortex generator shown in FIG. 4.

FIG. 4A is a cross-sectional view of a vortex generator 250 shown in FIG. 4. The illustrated vortex generator 250 is an ion vortex generator, but other vortex generators are also possible. In some embodiments, the ion vortex generator 250 includes two vortex generator electrodes 26 on the opposite sides of the vortex generator plate 25. In operation, the vortex generator electrodes 26 are energized at different voltages to produce ion flow 16 from one electrode to another. Generally, the vortices are produced by the vortex shedding from the vortex generator plate 25. In some embodiments, the flow of ions over the generator plate 25 can modulate the strength and/or position of the vortices generated by the generator plate 25. The electrodes may be insulated from the vortex generator plate 25 by an inner insulator 29, and may be insulated from the incoming flow by an outer insulator 28. In some embodiments, the vortex generator 250 can be entirely or partially made by 3D additive manufacturing, for example by printing materials directly over the aerodynamic structure 40.

Figure 5:
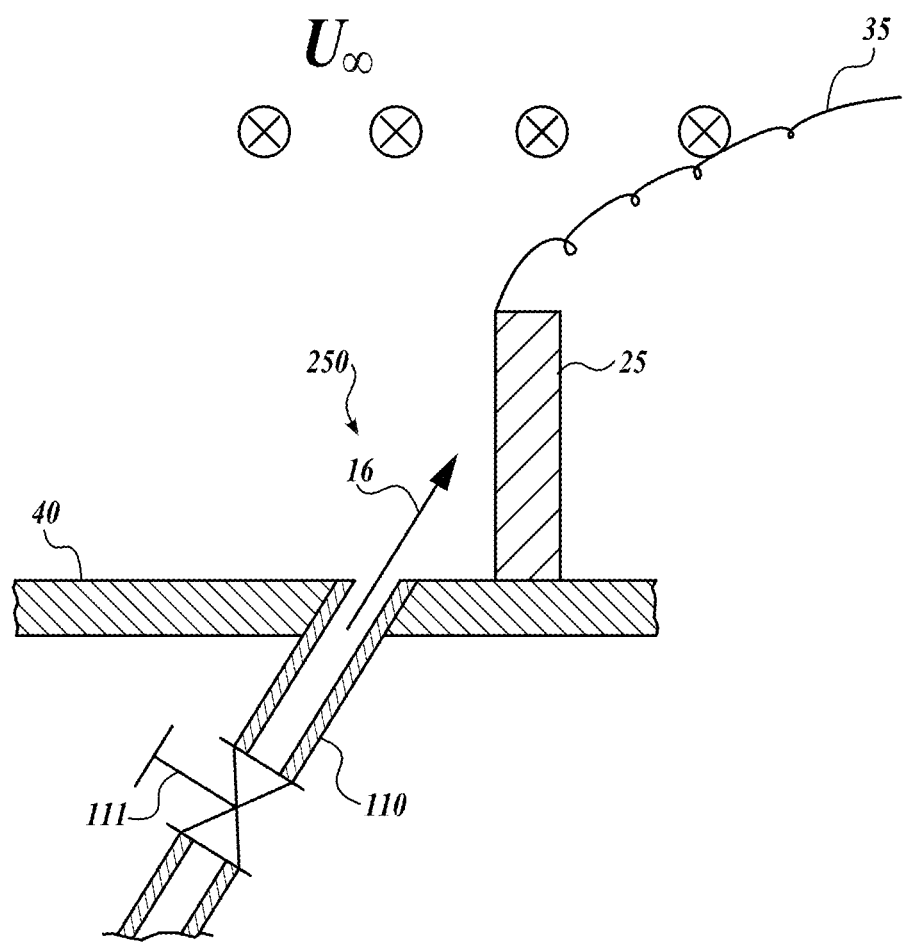
FIG. 5 is a schematic diagram of a vortex generator in accordance with embodiments of the presently disclosed technology.

FIG. 5 is a schematic diagram of a vortex generator in accordance with embodiments of the presently disclosed technology. The incoming free flow $U_\infty$ is directed into the plane of paper. In some embodiments, the vortex generator 250 includes an inclined actuator 110 that produces a jet 16 directed toward the vortex generator plate 25. In operation, the jet 16 interacts with the generator plate 25 to produce vortices. The incoming free stream at velocity $U_\infty$ sweeps the vortices in a helical vortex street 35 downstream from the vortex generator toward the actuators/sensors (not shown). In some embodiments, a valve 111 can be used to control the flow rate of the jet 16, or to control the periods of time when the vortices are generated. In some embodiments, the flow rate of the jet 16 controls the frequency and/or strength of the vortices.

Figure 6:
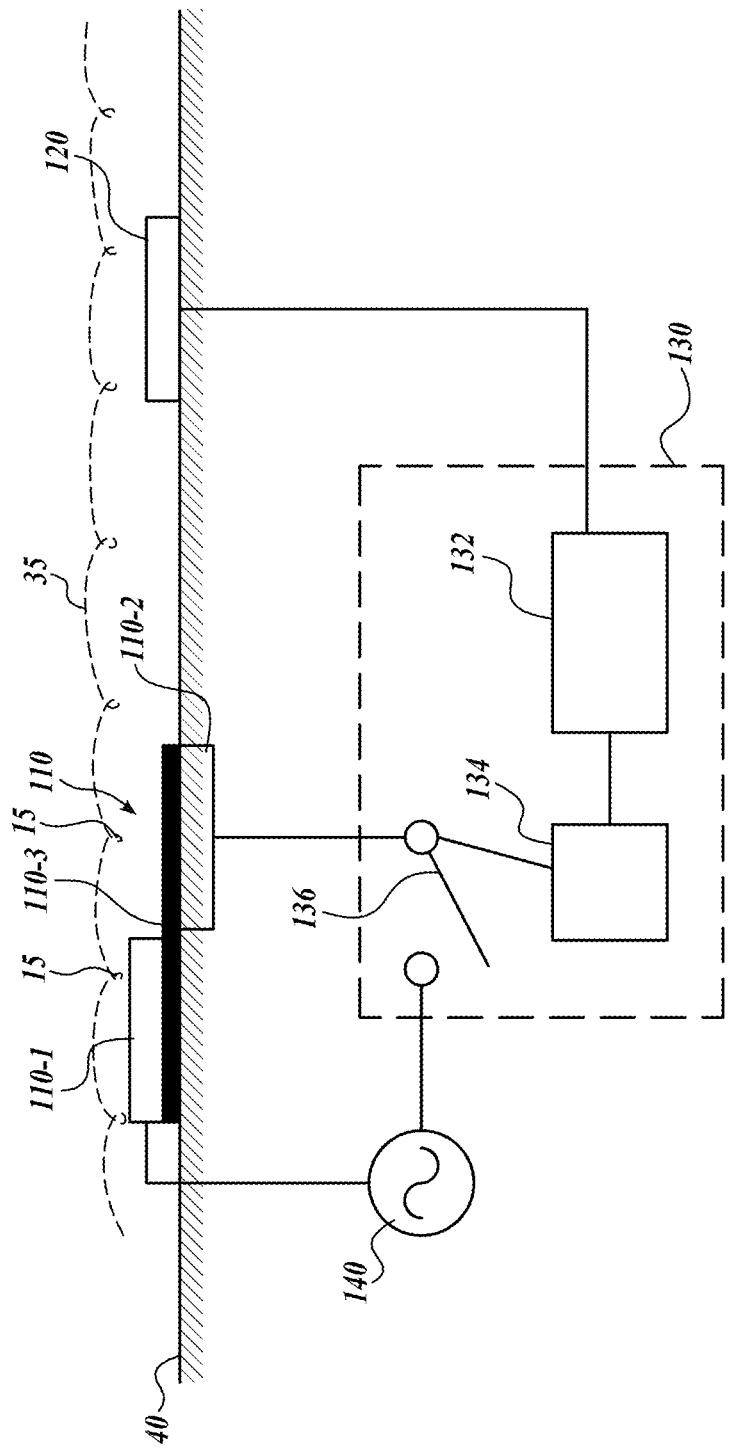
FIG. 6 is a schematic diagram of an active flow control in accordance with embodiments of the presently disclosed technology.

FIG. 6 is a schematic diagram of an active flow control in accordance with embodiments of the presently disclosed technology. The incoming free flow $U_\infty$ can be directed from left to right or from right to left. In some embodiments, the vortices 15 may be actuated by the actuators 110 based on feedback from the sensors 120. For example, a controller 130 may receive signal from the sensors 120, for example, pressure, temperature or velocity of the fluid. In some embodiments, the controller 130 can include an algorithm 132 for preparing instructions for a modulator 134. Based on the instructions from the algorithm, the modulator 134 may operate a switch 136 that energizes the actuator 110 by connecting the actuator to a power supply 140. In some embodiments, the modulator 134 may operate as a pulse width modulator or may modulate the actuator 110 at a specific frequency of interest (e.g., the frequency of vortex generation). In some embodiments, the actuator 110 is a plasma actuator having the electrodes 110-1 and 110-2 separated by an insulator 110-3. In operation, the ion flow between the electrodes may create a local flow that actuates the vortices 15 by, for example, biasing the vortices back to their steady position. In some embodiments, the actuator 110 may be partially or entirely deposited on the aerodynamic surface 40 by 3D printing methods.

Figure 7A:
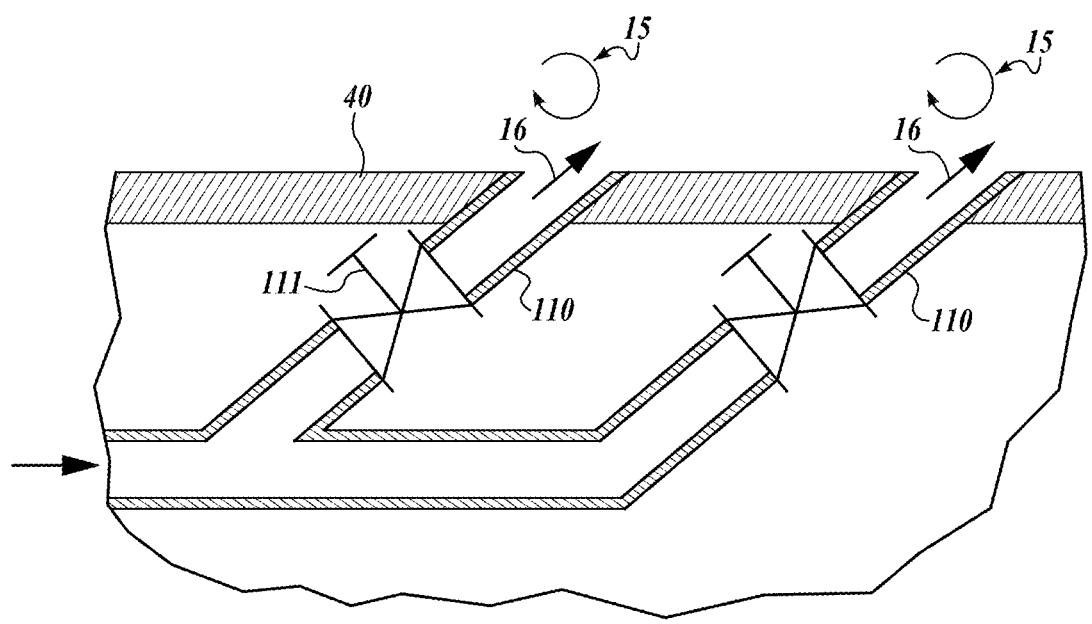
FIGS. 7A and 7B are schematic diagrams of the actuators in accordance with embodiments of the presently disclosed technology.
Figure 7B:
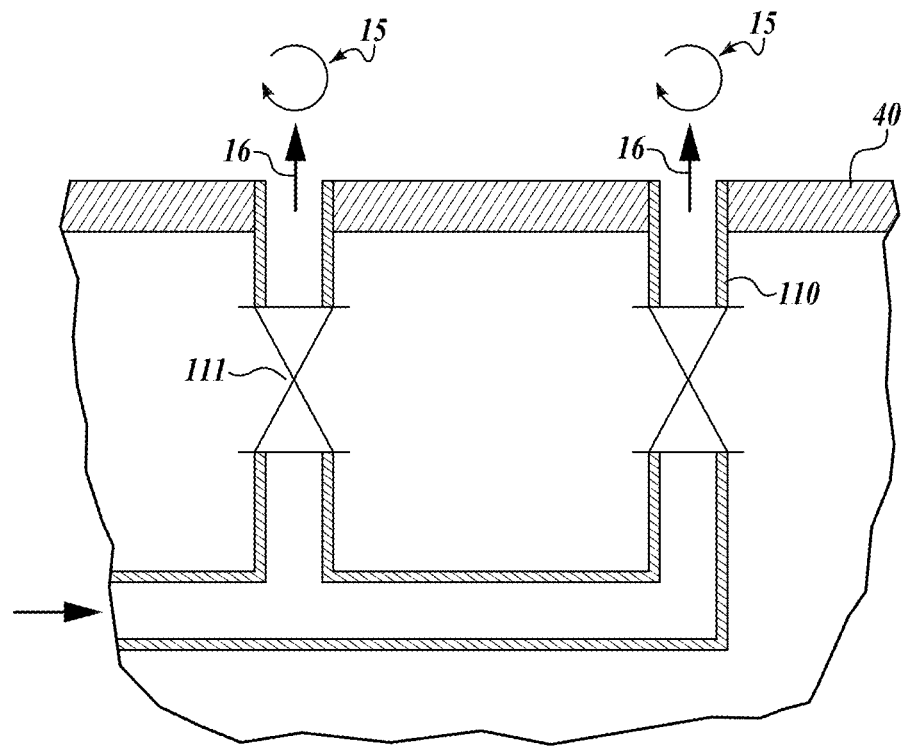

FIGS. 7A and 7B are schematic diagrams of the actuators 110 in accordance with embodiments of the presently disclosed technology. The incoming free flow $U_\infty$ is directed into the plane of paper. FIGS. 7A and 7B illustrate the vortices 15 distributed above aerodynamic structure 40. In some embodiments, the actuators 110 direct local jets 16 toward the vortices 15 to keep the vortices steady (or close to steady) with respect to the aerodynamic structure 40. The actuators 110 may direct the local jets 16 in a perpendicular or inclined direction with respect to the aerodynamic structure 40. In some embodiments, fluid in the local jets 16 is the same as in the flow around the aerodynamic structure 40 (e.g., air or water). In some embodiments, the actuators 110 include a bubble injector for injecting bubbles near a vortex, such that the bubbles migrate into the core of the vortex, resulting in a hollow-core vortex. In some embodiments, the control of the vortices 15 is improved and/or the acoustic signature of the vortices 15 is reduced when the vortices include the bubbles.

Figure 8A:
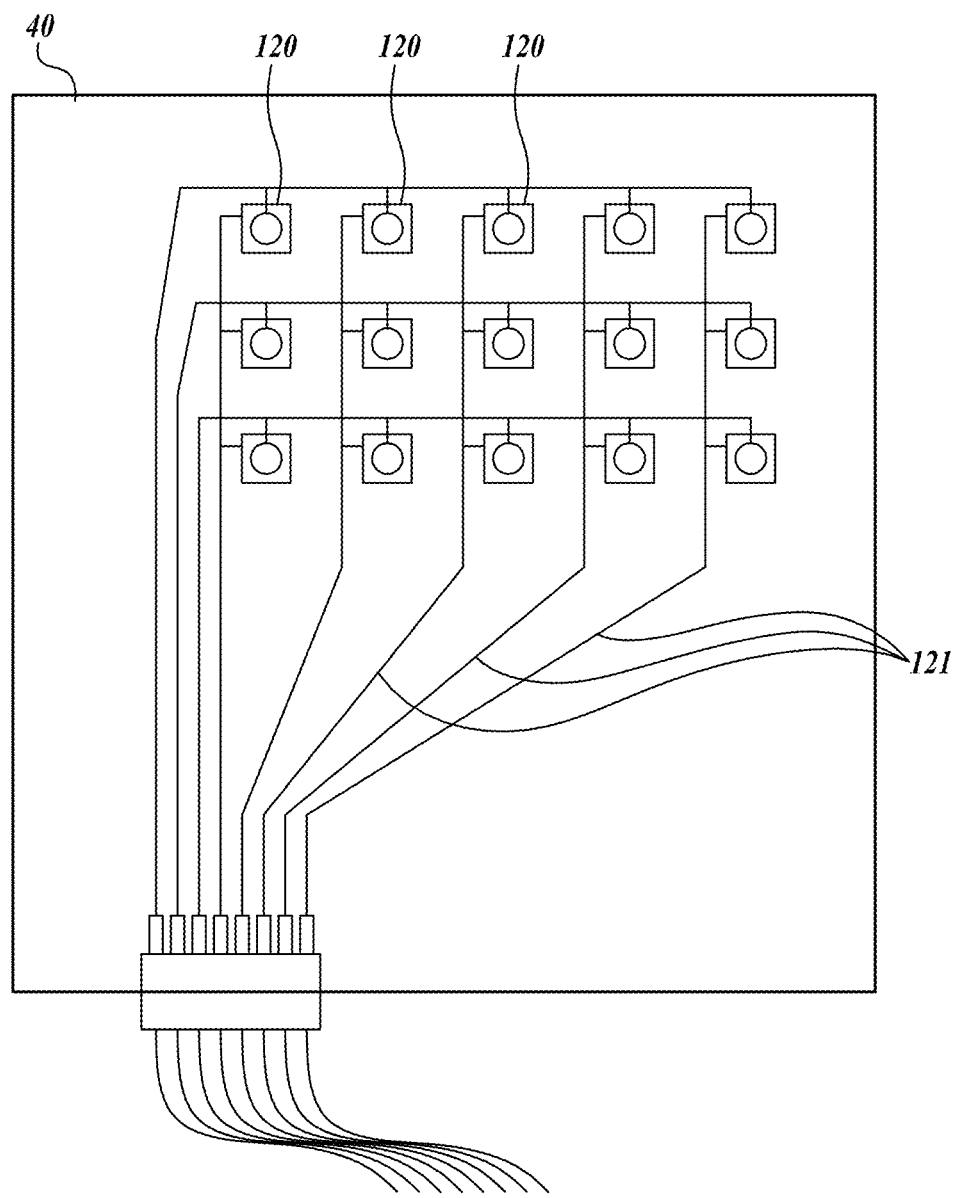
Figure 8C:
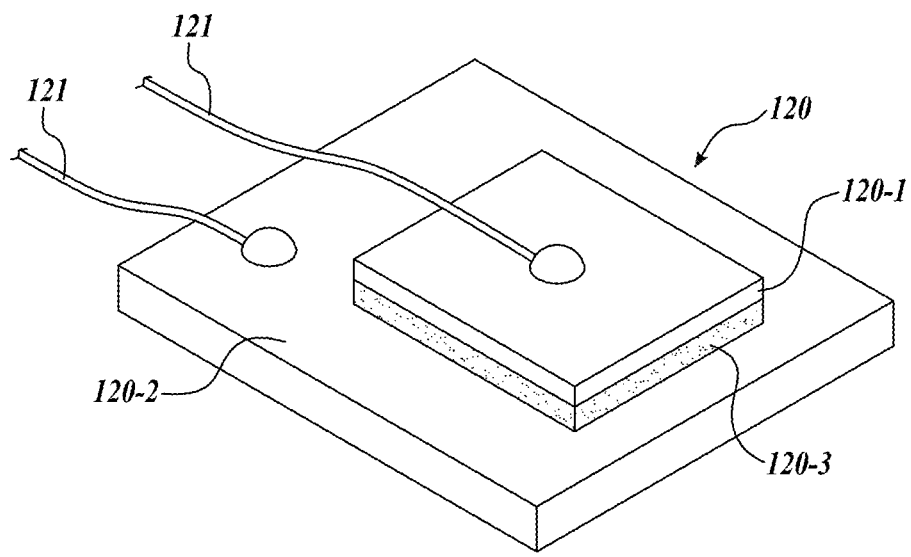

FIGS. 8A-8C are schematic views of sensors in accordance with embodiments of the presently disclosed technology. FIG. 8A shows an array of the sensors 120 on the aerodynamic structure 40. In some embodiments, the sensors 120 can be arranged in multiple rows and columns. The sensors 120 can be routed to, for example, an edge connector and further to the controller.

FIG. 8B shows a 3D printer 150 operating over the aerodynamic structure 40. In some embodiments, the 3D printer 150 deposits the sensors 120 and the electric traces 121 on the aerodynamic structure 40. In some embodiments, the sensors 120, the actuators 110 and/or the electric traces 121 can be placed on the aerodynamic structure 40 by a completely additive process over the aerodynamic structure. In other embodiments, parts of the aerodynamic structure 40 may be removed or otherwise adjusted to house the printed sensors, actuators and/or electric traces. For example, aerosol jet (AJ) printing may be used to deposit various sensors on the wind tunnel models of the aircraft or on the operational aircraft. In some embodiments, the highly conforming printed electronics AJ method can deposit functional sensing and acting networks for pressure, strain, and/or temperature on the aircraft structures. The printed elements may be few microns thick (5 µm-100 µm) and can be deposited on legacy systems, new systems, next generation of manned/unmanned flying platforms, and other aerodynamic structures.

FIG. 8C shows a sample sensor 120 manufactured by 3D printing. The illustrated sensor 120 is a piezoelectric sensor having an upper plate 120-1 and a lower plate 120-2. The upper and lower plates may be separated by a piezoelectric layer 120-3. The piezoelectric layer 120-3 may include lead zirconate titanate (LZT), polyvinylidene fluoride (PVDF), quartz, or other piezoelectric materials. In operation, the upper plate 120-1 can output a voltage into the traces 121 based on the pressure of the surrounding fluid, which, in turn, corresponds to the distance between the sensor 120 and the vortex 15. The traces 121 may transmit the voltage to a controller, which, using an algorithm provides suitable instructions to the actuators.

FIGS. 9A-9F are schematic views of actuator operation for active flow control in accordance with embodiments of the presently disclosed technology. The incoming free flow $U_\infty$ is directed into the plane of paper. In each Figure, a local velocity $U_L$ affects rotational velocity (W or VS—vortex strength) and/or translation velocity (V or VV—vortex velocity) of the vortex 15. In some embodiments, actuators 110 may be the ionic or plasma actuators having two electrodes that are energized at different potentials. In other embodiments, actuators 110 may be jet actuators or other actuators. The direction of the free flow in FIGS. 9A-9F is into the plane of paper, therefore the illustrated actuators 110 generally affect the spanwise location of the vortices, as explained below.

Figure 9B:
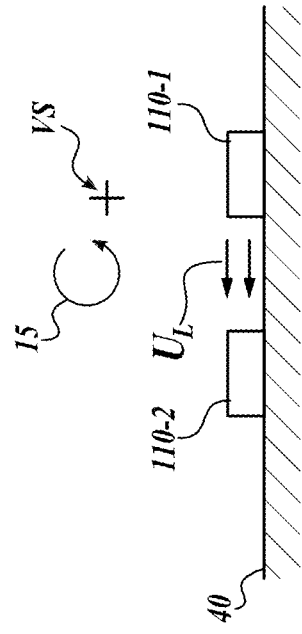
FIGS. 9A-9F are schematic views of actuator operation for active flow control in accordance with embodiments of the presently disclosed technology.
Figure 9D:
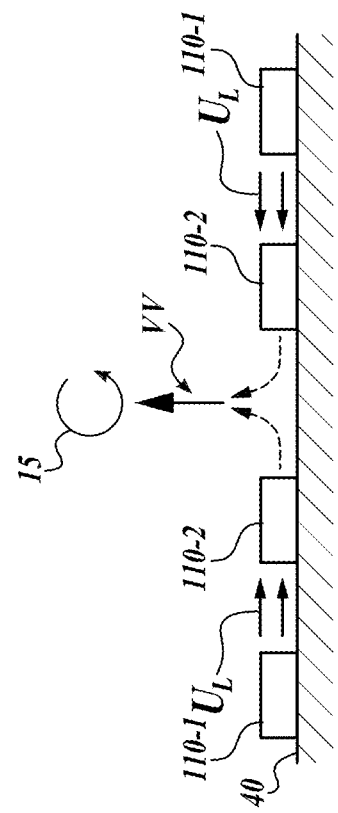
Figure 9A:
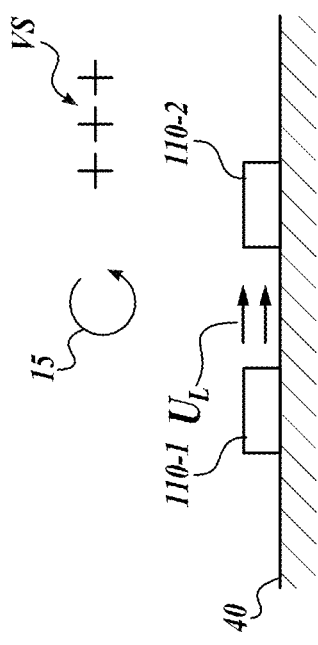

FIG. 9A illustrates the local velocity $U_L$ that is aligned with the rotation of the vortex 15. As a result, the vortex strength VS is increased. FIG. 9B illustrates the case where the local velocity $U_L$ counteracts the rotation of the vortex 15, therefore the vortex strength VS is reduced.

Figure 9C:
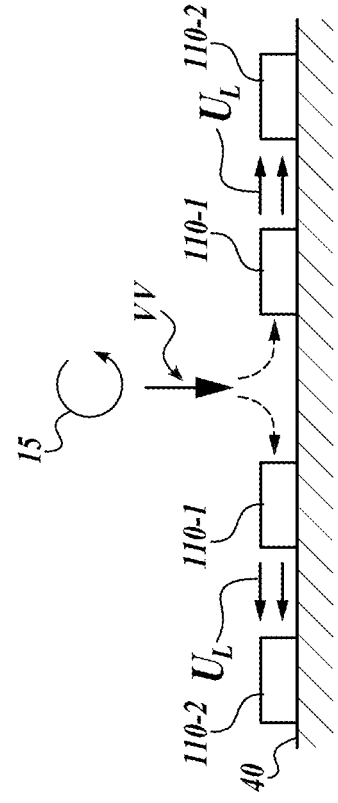

FIG. 9C illustrates interaction of two local velocities $U_L$ that produce lower pressure under the vortex 15, because the fluid under the vortex 15 is pushed away. As a result, the vortex 15 is drawn toward the aerodynamic structure 40. FIG. 9D illustrates the case where two local velocities $U_L$ are directed toward each other. As a result, the fluid under the vortex 15 pushes the vortex away from the aerodynamic structure 40.

Figure 9E:
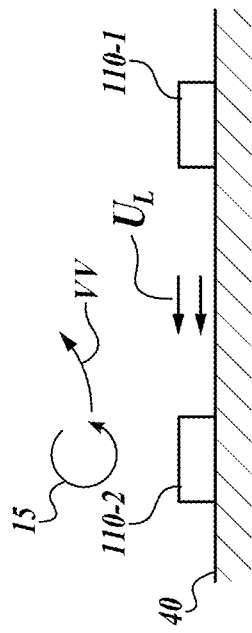
Figure 9F:
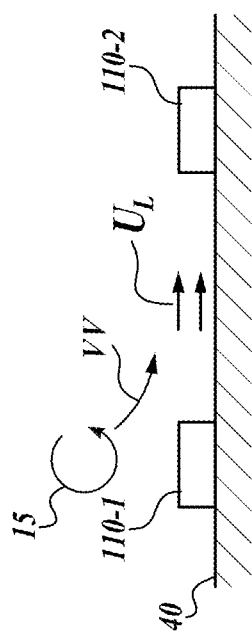

FIGS. 9E and 9F illustrate an embodiment of the active control where the vortex 15 needs to be moved to the right in the spanwise direction in accordance with the overall control of the position of the vortices. In general, the pressure of fluid has its local minimum directly under the vortex 15. As the fluid particle near the aerodynamic structure 40 moves in the spanwise direction, the particle will first experience a falling pressure as it approaches the point directly under the vortex 15. After the fluid particle passes directly under the vortex 15, the pressure on the fluid particle rises. In order to help the spanwise boundary layer cope with this rising pressure, the spanwise force from the actuator should be located to the right of the point directly under the vortex.

FIG. 9E illustrates the actuator 110 that produces the local velocity $U_L$ to the right in the spanwise direction from the vortex 15. Since the local velocity $U_L$ is aligned with the rotation of the vortex 15, the interaction between the vortex 15 and the local velocity $U_L$ acts to pull the vortex 15 to the right and toward the aerodynamic structure 40. In FIG. 9F, since the local velocity $U_L$ is opposite from the rotation of the vortex 15, the interaction between the vortex 15 and the local velocity $U_L$ acts to push the vortex 15 away from the aerodynamic structure 40. Other locations of the actuators 110, and other interactions between the vortices and actuators are also possible. For example, the vortices may be moved to the left in the spanwise direction by the actuators 110.

Figure 10:
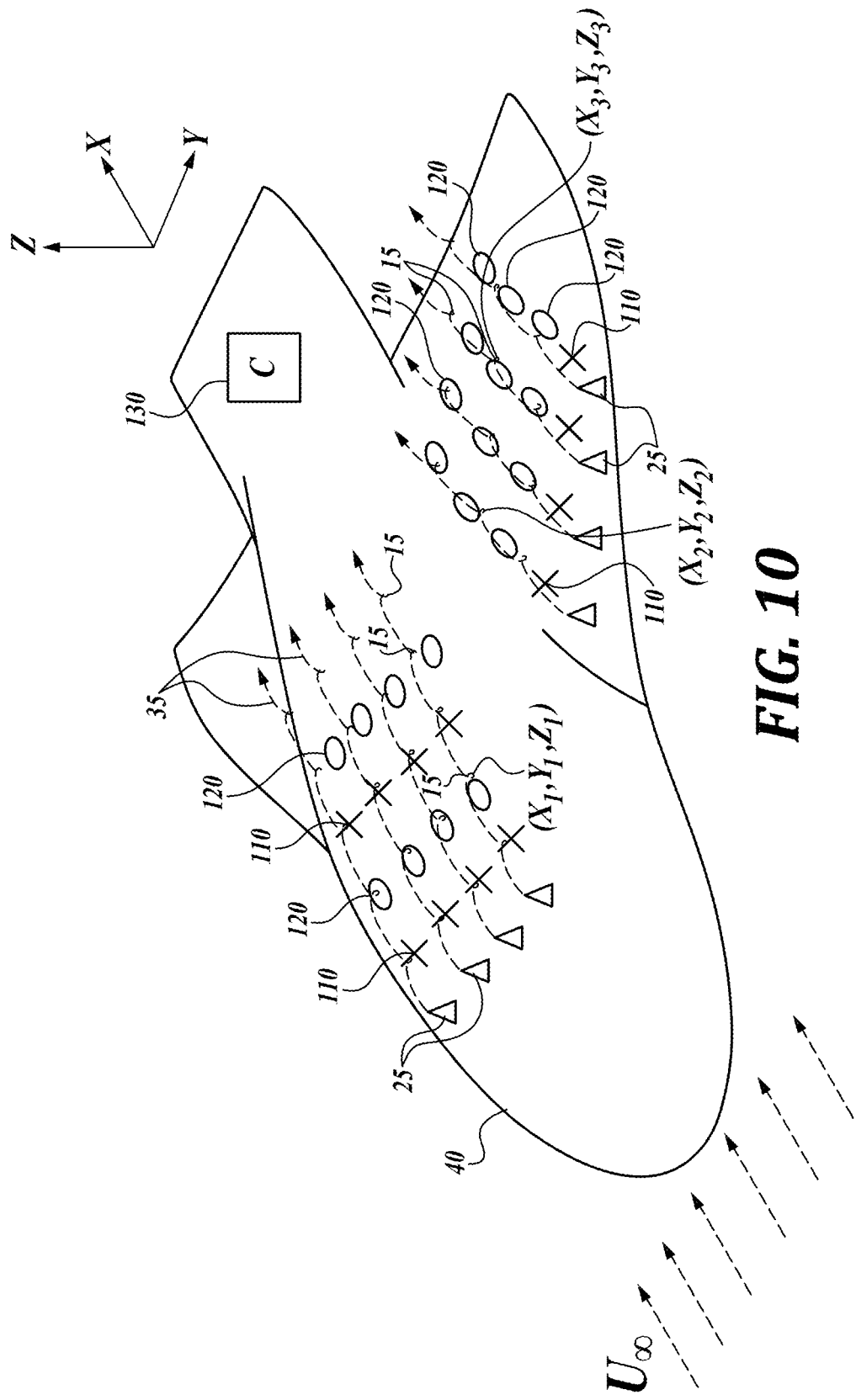
FIG. 10 is an isometric view of an airplane having active flow control in accordance with embodiments of the presently disclosed technology.

FIG. 10 is an isometric view of an airplane having active flow control in accordance with embodiments of the presently disclosed technology. In some embodiments, the aerodynamic structure 40 (e.g., an airplane) may carry the actuators 110 and the sensors 120 that are distributed over the wings and/or over the fuselage of the aircraft. The actuators 110 and the sensors 120 may be distributed in the alternating rows, as illustrated with the fuselage of the airplane 40, or one row of the actuators 110 may be followed by multiple rows of the sensors 120, as illustrated with the wing of the airplane. Other distributions of the actuators 110 and the sensors 120 are also possible. In operation, the sensors 120 send signals to the controller 130, which controls the actuation of the actuators 110 such that the vortices 15 are kept at given locations X, Y, Z, or as close to these locations as possible. As explained above, as the motion of the vortices 15 in the spanwise direction is reduced, the onset of the turbulence over the aerodynamic structure 40 is also delayed.

Figure 11:
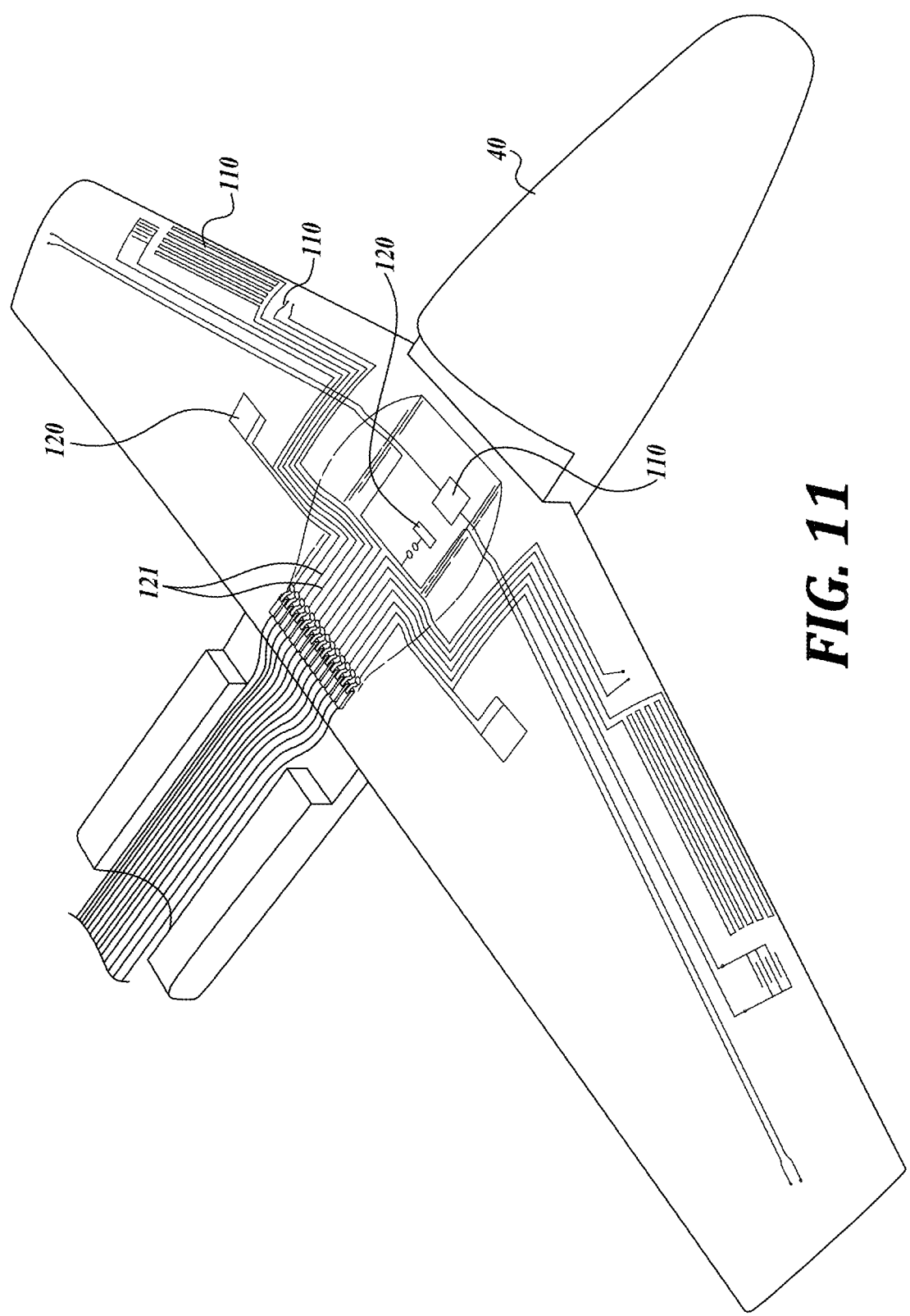
FIG. 11 is an isometric view of an airplane structure having active flow control in accordance with embodiments of the presently disclosed technology.

FIG. 11 is an isometric view of an airplane structure having active flow control in accordance with embodiments of the presently disclosed technology. The illustrated airplane structure carries 3D printed actuators 110, sensors 120 and traces 121. In some embodiments, the actuators 110 and the sensors 120 may be made entirely by the additive technologies. In some embodiments, the actuators 110 may be 3D printed heaters capable of changing the density and/or viscosity of the incoming fluid to actuate the location and/or strength of the vortices 15. An example of the 3D printed heaters in operation is described with reference to FIG. 12 below.

Figure 12:
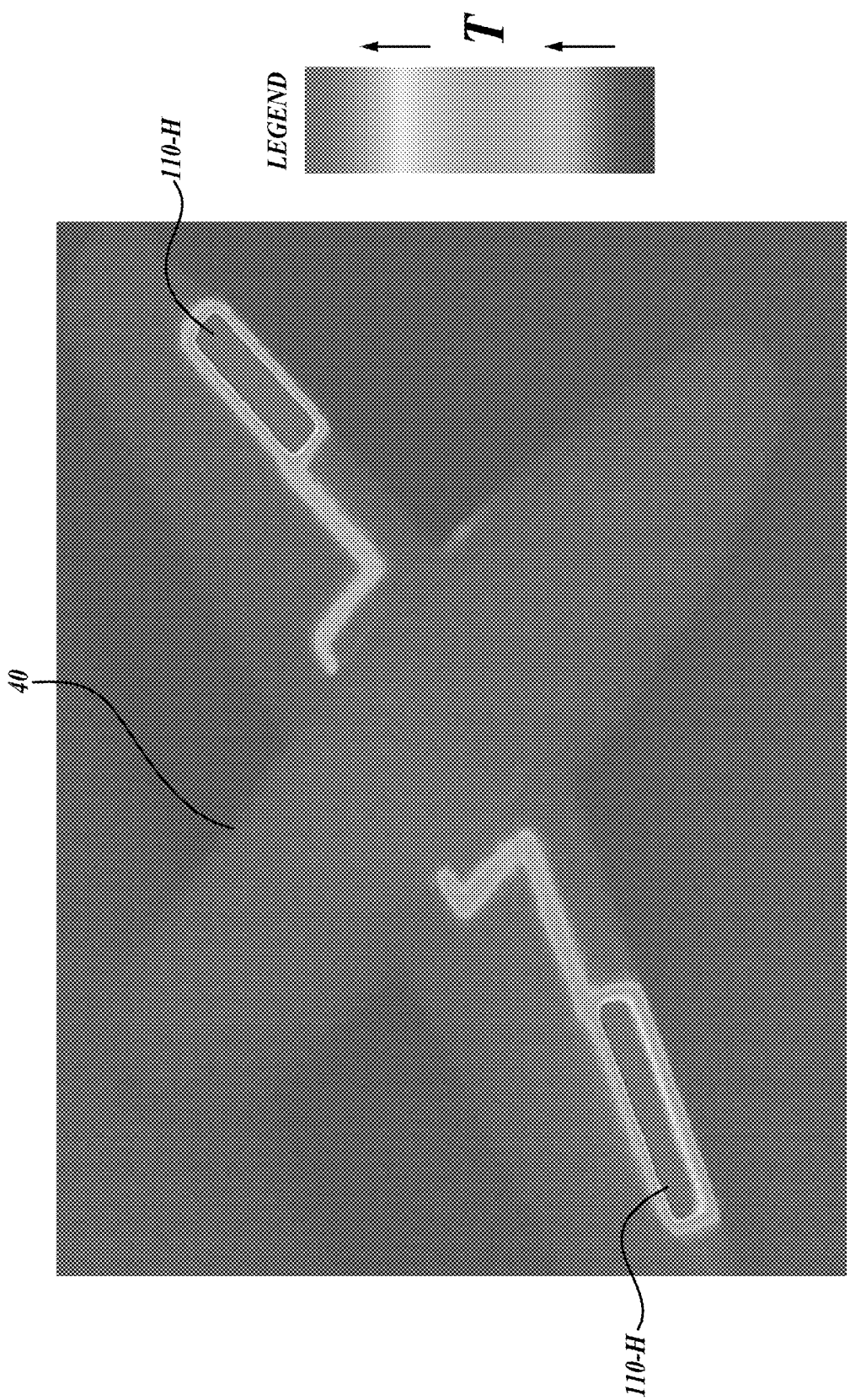
FIG. 12 is a 2D graph of printed sensors operating in accordance with the embodiments of the presently disclosed technology.

FIG. 12 is a 2D graph (e.g., an infrared graph or a thermal image) of printed sensors operating in accordance with embodiments of the presently disclosed technology. In the illustrated embodiments, the actuators 110 are 3D printed heaters. In operation, based on the input from the controller 130, the actuators 110-H are heated to a temperature above that of the surrounding fluid to change the density and/or viscosity of the fluid proximate to the vortices that need to be controlled.

Figure 13:
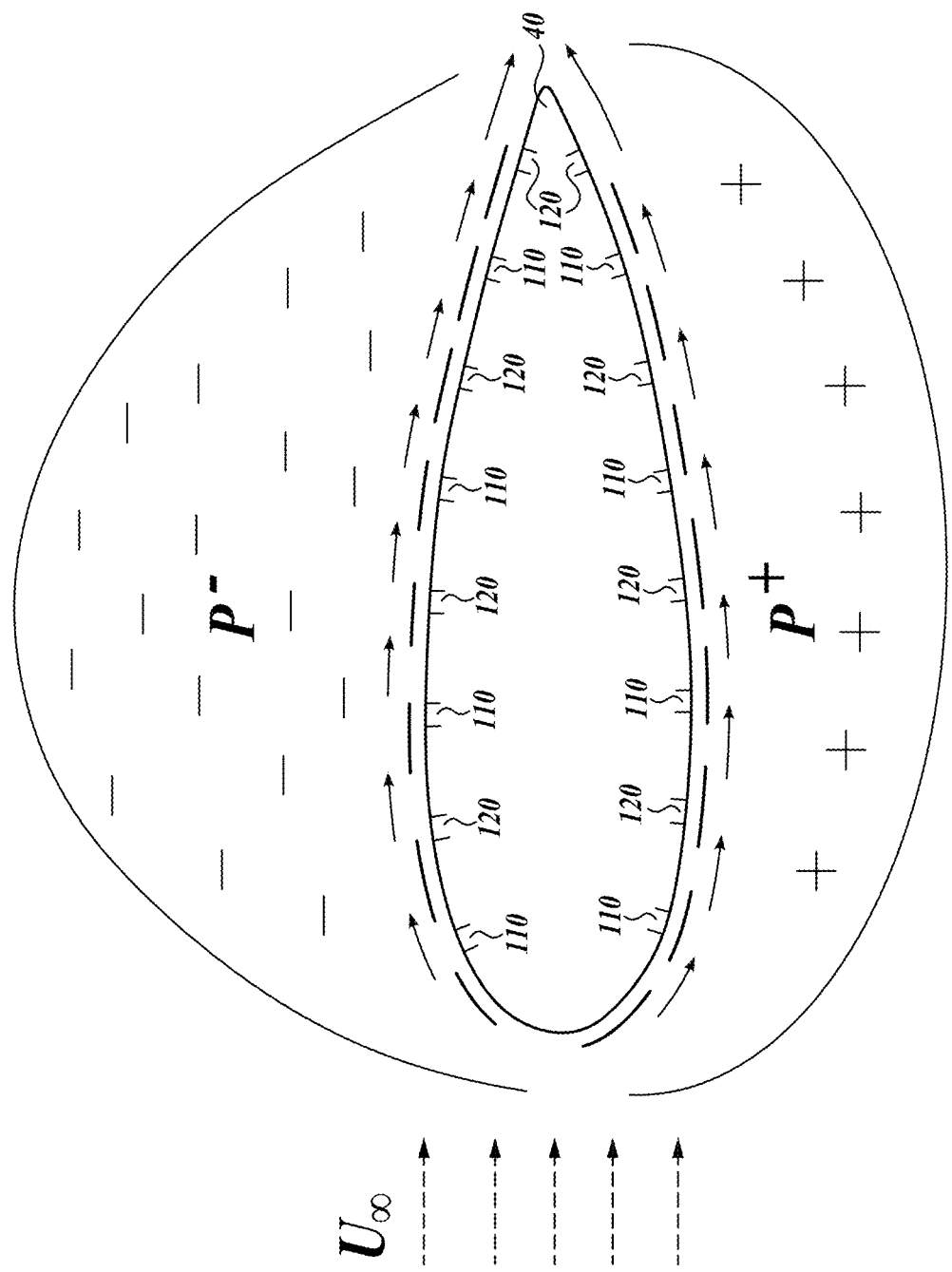
FIG. 13 is an isometric view of an airplane structure having active flow control in accordance with embodiments of the presently disclosed technology.

FIG. 13 is an isometric view of an airplane structure having active flow control in accordance with embodiments of the presently disclosed technology. In some embodiments, the aerodynamic structure 40 can be a lifting body that carries the actuators 110, for example the ionic or plasma actuators. The actuators 110 may create multiple jets nearby the surface of the aerodynamic structure 40, therefore producing a net lift. For example the jets on the lower surface of the aerodynamic structure 40 may be stronger or more numerous than the jets on the upper surface of the aerodynamic structure 40 to create the net lift.

Figure 14:
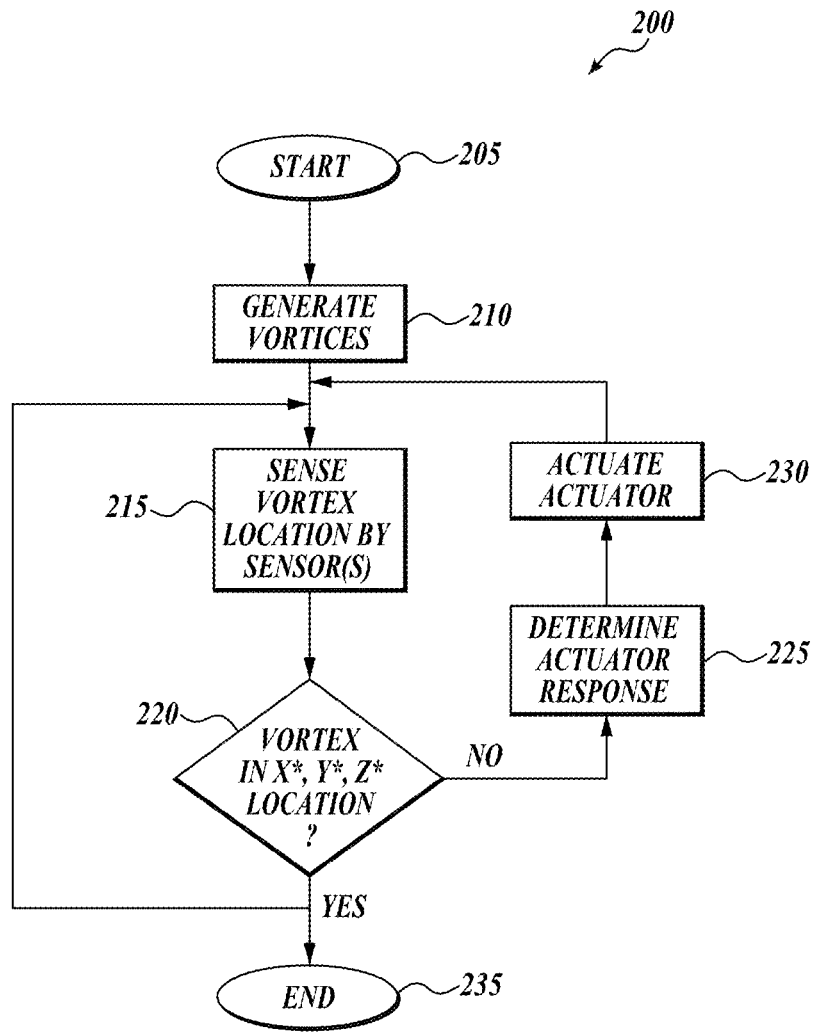
FIG. 14 is a flow diagram of a method for the active flow control in accordance with embodiments of the presently disclosed technology.

FIG. 14 is a flow diagram of a method for the active flow control in accordance with embodiments of the presently disclosed technology. The method can start in step 205. In step 210, the vortices 15 are generated by, for example, vortex generator 250. In some embodiments, the vortices 15 may be generated by the aerodynamic structure 40 without having dedicated vortex generators.

In step 215, one or more sensors 120 sense the location of the vortices 15. In step 220, the controller determines the location of the vortices based on the input from the sensors. If the vortex is not in the required X*, Y*, Z* location, the method proceeds to step 225.

In step 225, the controller determines the required actuation of the actuator. For example, the controller may include algorithms for processing the input from the sensors 120 to determine which actuators to actuate and at which actuation level.

In step 230, the actuators 110 are actuated in response to signal from controller. Next, the vortex location is sensed again in step 215, and a determination about the vortex location is made in step 220. If the vortex 15 is located in the required location, the method may end in step 235.

Many embodiments of the technology described above may take the form of computer- or controller-executable instructions, including routines executed by a programmable computer or controller. Those skilled in the relevant art will appreciate that the technology can be practiced on computer/controller systems other than those shown and described above. The technology can be embodied in a special-purpose computer, controller or data processor that is specifically programmed, configured or constructed to perform one or more of the computer-executable instructions described above. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like).

From the foregoing, it will be appreciated that specific embodiments of the technology have been described herein for purposes of illustration, but that various modifications may be made without deviating from the disclosure. For example, icing of the aerodynamic structure may be controlled by controlling the wetting of the fractal surface. In general, if the surface of the aerodynamic structure is not wetted, it is possible that ice will not accumulate on it. In some embodiments, the wetting of the surfaces may be controllable by controlling the stationarity of the vortices, therefore preventing or delaying the onset of the icing. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Accordingly, the disclosure can encompass other embodiments not expressly shown or described herein.

The invention claimed is:

1. A method for active control of vortices over a solid surface, comprising:
   generating vortices proximate to the solid surface;
   sensing locations of the vortices by printed skin sensors; and
   maintaining the vortices in fixed spanwise positions with respect to the solid surface by actuation of printed skin actuators.

2. The method of claim 1, further comprising:
   maintaining the vortices at fixed heights with respect to the solid surface by actuation of the printed skin actuators.

3. The method of claim 1, further comprising:
   sensing strength of vortices by the printed skin sensors.

4. The method of claim 1, further comprising:
   receiving an input from the printed skin sensors by a controller; and
   providing an output from the controller for the actuation of the printed skin actuators.

5. The method of claim 4, wherein the controller includes an algorithm.

6. The method of claim 1, wherein the vortices are generated by at least one vortex generator plate.

7. The method of claim 6, wherein the at least one vortex generator plate carries a first vortex generator electrode and a second vortex generator electrode, the method further comprising:
   generating a flow of ions from the first vortex generator electrode to the second vortex generator electrode; and
   in response to generating the flow of ions, modulating strength or location of the vortices.

8. The method of claim 6, wherein the surface includes a wavy wall, and wherein the sensors and actuators are disposed downstream of the wavy wall.

9. The method of claim 6, wherein the vortices are located along troughs of the wavy wall.

10. The method of claim 1, wherein the sensors are pressure sensors.

11. The method of claim 1, wherein the sensors are printed by 3D additive manufacturing over the surface.

12. The method of claim 1, wherein the actuators are printed by 3D additive manufacturing over the surface, and wherein the actuators are selected from a group consisting of: an ionic wind generator, a plasma actuator, a chemical actuator, an optical actuator, an electromagnetic actuator, and a pneumatic actuator.

13. The method of claim 1, wherein the actuators generate a local flow directly vertically under corresponding vortices.

14. The method of claim 13, wherein the actuators are configured for generating localized jets toward the vortices.

15. The method of claim 1, wherein the actuators generate a local flow that is vertically offset with respect to a location of the corresponding vortices.

16. A system for active control of vortices over a solid surface, comprising:
   a vortex generator configured for generating vortices proximate to the solid surface;
   printed skin sensors configured to sense locations of the vortices;

a controller configured to receive an input from the printed skin sensors; and printed skin actuators, wherein the controller is configured to maintain the vortices in fixed spanwise locations with respect to the solid surface using the printed skin actuators.

17. The system of claim 16, wherein the printed skin actuators are configured to maintain the vortices at fixed heights with respect to the solid surface.

18. The system of claim 16, wherein the printed skin sensors are pressure sensors, stress sensors, or velocity sensors.

19. The system of claim 18, wherein the pressure sensors are embedded in the surface.

20. The system of claim 16, wherein the printed skin sensors and the printed skin actuators are deposited on the surface by an additive 3D printing.

21. The system of claim 20, wherein the printed skin sensors and the printed skin actuators are less than 10 microns thick.

22. The system of claim 16, wherein the printed actuators are selected from a group consisting of: an ionic wind generator, a plasma actuator, a chemical actuator, an optical actuator, an electromagnetic actuator, and a pneumatic actuator.

23. The system of claim 22, wherein the controller changes a polarity of a voltage applied to the ionic wind generator or the plasma actuator.

24. The system of claim 22, wherein the surface is a part of: a three dimensional printed model of an aircraft, a machined model of an aircraft or a portion of an aircraft, a cast model of an aircraft or a portion of an aircraft, an Unmanned Aerial Vehicle (UAV), helicopter, a propeller airplane, a jet airplane, a wind turbine blade, a turbine blade, a rocket, or a car.

25. The system of claim 16, wherein the vortex generator comprises:

a vortex generator plate that carries a first vortex generator electrode and a second vortex generator electrode, wherein the vortex plate is configured to generate vortices, and wherein the first and the second vortex generator electrodes are configured to generate a flow of ions that modulates strength or position of the vortices.

26. The system of claim 16, wherein the controller is configured to compute an intensity and a position of the at least one vortex based on an input signal received from the pressure sensors.

27. The system of claim 16, wherein the actuators generate a local flow directly under corresponding vortices.

28. The system of claim 16, wherein the surface is an underwater surface, and wherein the actuators inject gaseous bubbles near vortices, and wherein the bubbles migrate into cores of the vortices, resulting in hollow-core vortices.

29. The system of claim 16, wherein the printed skin sensors are further configured to sense strength of the vortices.

* * * * *